United States Patent
Kim et al.

(10) Patent No.: US 10,027,771 B2
(45) Date of Patent: Jul. 17, 2018

(54) SYSTEM AND METHOD FOR MEASURING POSITION

(71) Applicant: SAMSUNG SDS CO., LTD., Seoul (KR)

(72) Inventors: Sung-Hwan Kim, Seoul (KR); Jae-Wook Sim, Seoul (KR); Moo-Sung Ji, Seoul (KR); Jung-Woo Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 15/599,806

(22) Filed: May 19, 2017

(65) Prior Publication Data

US 2017/0339236 A1    Nov. 23, 2017

(30) Foreign Application Priority Data

May 19, 2016    (KR) .................. 10-2016-0061279

(51) Int. Cl.

| | |
|---|---|
| *H04W 24/00* | (2009.01) |
| *H04L 29/08* | (2006.01) |
| *H04W 64/00* | (2009.01) |
| *H04W 4/02* | (2018.01) |
| *G01S 5/14* | (2006.01) |
| *G01S 5/00* | (2006.01) |

(52) U.S. Cl.
CPC ............ *H04L 67/18* (2013.01); *G01S 5/0009* (2013.01); *G01S 5/14* (2013.01); *H04W 4/023* (2013.01); *H04W 64/006* (2013.01)

(58) Field of Classification Search
CPC ................... G01S 5/14; H04W 4/023
USPC ...... 455/420, 230, 433, 456.2, 456.1, 404.2, 455/411, 456.3; 370/338; 701/23; 710/16
See application file for complete search history.

(56) References Cited

U.S. PATENT DOCUMENTS

| | | | |
|---|---|---|---|
| 2007/0083296 A1* | 4/2007 | Tengler | G08G 1/096716 701/1 |
| 2009/0029715 A1* | 1/2009 | Burchardt | H04W 64/00 455/456.1 |
| 2009/0287853 A1* | 11/2009 | Carson | H04W 4/02 710/16 |
| 2010/0023246 A1* | 1/2010 | Zhao | G01C 21/3492 701/117 |
| 2012/0044922 A1* | 2/2012 | Ishii | H04L 5/001 370/338 |
| 2015/0345951 A1* | 12/2015 | Dutta | G01C 21/3605 701/400 |

* cited by examiner

*Primary Examiner* — Kiet Doan
(74) *Attorney, Agent, or Firm* — Sughrue Mion, PLLC

(57) ABSTRACT

A system and method for measuring a location are provided. The system for measuring a location comprises a receiving device comprising a directional antenna the receiving device being configured to receive a signal from a mobile device in a path at a signal sensing direction side of the directional antenna, and a server configured to receive from the receiving device, information on the signal, determine a location of the mobile device based on the information on the signal, and determine a degree of congestion of the path using the location.

14 Claims, 11 Drawing Sheets

SYSTEM AND METHOD FOR MEASURING POSITION

CROSS-REFERENCE TO RELATED APPLICATION

This application claims priority to and the benefit of Korean Patent Application No. 10-2016-0061279, filed on May 19, 2016, the disclosure of which is incorporated herein by reference in its entirety.

BACKGROUND

1. Field

The present disclosure relates to indoor positioning technology, and more particularly, to a system and method for measuring a location.

2. Discussion of Related Art

Along with a proliferation of portable personal terminals focusing on smart phones, the market of a location-based service (LBS) which provides service according to a location of a user is rapidly growing. The service range of an initial LBS was limited to outdoor space in which it is possible to acquire location information of a user through a satellite navigation system, such as a global positioning system (GPS). However, the available service range is currently expanding to indoor space as well, and a demand for the LBS is continuously increasing.

There are various indoor positioning methods, and trilateration, triangulation, and fingerprint positioning are generally used.

However, existing positioning methods require multiple radio frequency (RF) receivers and involve a cumbersome positioning process. Specifically, the trilateration involves separate calculation of distances between at least three RF receivers and a mobile device, and the triangulation requires at least three RF receivers and an additional device for measuring angles at (or directions in) which signals are received from the RF receivers. Also, the fingerprint positioning requires multiple RF receivers and involves onerously collecting fingerprints at respective locations in advance. Further, according to the existing positioning methods, since RF receivers sense a signal using omnidirectional antennas, locating of a mobile device is much affected by characteristics of a radio wave and surroundings, and there is a risk that a signal will be sensed in a duplicated manner.

SUMMARY

The present disclosure is directed to easily measuring a location of a mobile device in an inexpensive and simple way and acquiring path-specific degrees of congestion, a movement of the mobile device, and a period of stay of the mobile device.

According to an aspect of the present disclosure, there is provided a system for measuring a location, the system comprising: a receiving device including a directional antenna, the receiving device being configured to receive a signal from a mobile device in a path at a signal sensing direction side of the directional antenna; and a server configured to receive from the receiving device, information on the signal, determine a location of the mobile device based on the information on the signal, and determine a degree of congestion of the path using the location.

The information on the signal may comprise at least one from among identification information of the mobile device, a received signal strength indication (RSSI) of the signal, identification information of the receiving device, and a time at which the receiving device has received the signal.

The server may further configured to calculate a distance between the mobile device and the receiving device based on the information on the signal and determine the location of the mobile device based on the distance.

The server may further configured to separately calculate distances between a test device and the receiving device using Equation 1 while a location of the test device in the path is changed, and calculate a signal loss coefficient N which results in a smallest sum of differences between the calculated distances between the test device and the receiving device and actual distances between the test device and the receiving device:

$$d = 10^{\frac{TxPower-RSSI}{10*N}} \quad \text{[Equation 1]}$$

(wherein d is the distance between the test device and the receiving device, TxPower is a strength of a signal transmitted by the receiving device, and the RSSI is a strength of the signal received by the receiving device, and N denotes the signal loss coefficient).

The server may further configured to calculate another distance between the mobile device and the receiving device by applying the calculated signal loss coefficient N to Equation 2:

$$d' = 10^{\frac{TxPower-RSSI}{10*N}} \quad \text{[Equation 2]}$$

(wherein d' is the other distance between the mobile device and the receiving device, TxPower is the strength of the signal transmitted by the receiving device, and the RSSI is the strength of the signal received by the receiving device).

The server may further configured to generate a path map comprising nodes and links between the nodes, match the receiving device to a node, and determine one point in a link whose distance from the node corresponds to the distance between the mobile device and the receiving device, as the location of the mobile device.

The server may further configured to calculate a number of mobile devices in the link and determine the degree of congestion of the path from the number of mobile devices.

The server may further configured to acquire a movement and a period of stay of the mobile device from the location of the mobile device and a time at which the receiving device has received the signal.

The server may display at least one from among the degree of congestion of the path, the movement of the mobile device, and the period of stay of the mobile device.

According to another aspect of the present disclosure, there is provided a method of measuring a location, the method including: receiving, by a receiving device having a directional antenna, a signal from a mobile device in a path at a signal sensing direction side of the directional antenna; receiving, by a server, information on the signal from the receiving device; determining, by the server, a location of the mobile device based on the information on the signal; and determining, by the server, a degree of congestion of the path based on the location.

The information on the signal may comprise at least from among identification information of the mobile device, an RSSI of the signal, identification information of the receiving device, and a time at which the receiving device has received the signal.

The determining of the location of the mobile device may include: calculating a distance between the mobile device and the receiving device based on the information on the signal; and determining the location of the mobile device based on the distance.

The calculating of the distance between the mobile device and the receiving device may comprise: separately calculating distances between a test device and the receiving device using Equation 1 while a location of the test device in the path is changed; and calculating a signal loss coefficient N which results in a smallest sum of differences between the calculated distances between the test device and the receiving device and actual distances between the test device and the receiving device:

$$d = 10^{\frac{TxPower-RSSI}{10*N}} \quad \text{[Equation 1]}$$

(wherein d is the distance between the test device and the receiving device, TxPower is a strength of a signal transmitted by the receiving device, and the RSSI is a strength of the signal received by the receiving device).

The calculating of the distance between the mobile device and the receiving device may further comprise calculating another distance between the mobile device and the receiving device by applying the calculated signal loss coefficient N to Equation 2:

$$d' = 10^{\frac{TxPower-RSSI}{10*N}} \quad \text{[Equation 2]}$$

(wherein d' is the other distance between the mobile device and the receiving device, TxPower is the strength of the signal transmitted by the receiving device, and the RSSI is the strength of the signal received by the receiving device).

The determining of the location of the mobile device using the distance may comprise: generating a path map comprising nodes and links between the nodes; matching the receiving device to a node; and determining one point in a link whose distance from the node corresponds to the distance between the mobile device and the receiving device as the location of the mobile device.

The determining of the degree of congestion may comprise calculating a number of mobile devices in the link and determining the degree of congestion of the path from the number of mobile devices.

The method may further comprise determining, by the server, a movement and a period of stay of the mobile device from the location of the mobile device and the time at which the receiving device has received the signal.

The method may further comprise displaying, by the server, at least one from among the degree of congestion of the path, the movement of the mobile device, and the period of stay of the mobile device.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present disclosure will be described in detail with reference to the appended drawings. The following description is provided to help comprehensive understanding of a method, an apparatus, and/or a system disclosed herein. However, the description is exemplary only, and the present disclosure is not limited thereto.

In descriptions of exemplary embodiments of the present disclosure, a detailed description of well-known technology related to the present disclosure will be omitted if it would unnecessarily obscure the subject matter of the present disclosure. Further, the terms to be described below are defined in consideration of functions in the present disclosure and may vary depending on a user's or an operator's intention or practice. Accordingly, the definition may be made on the basis of the contents throughout the specification. The terminology used in Detailed Description is provided to only describe exemplary embodiments of the present disclosure and not for purposes of limitation. Unless the context clearly indicates otherwise, the singular forms include the plural forms. It will be understood that the terms "comprise" or "include" when used herein, specify some features, numbers, steps, operations, elements, a part thereof and/or combinations thereof and do not preclude the presence of one or more other features, numbers, steps, operations, elements, a part thereof and/or combinations thereof in addition to the description.

Figure 1:
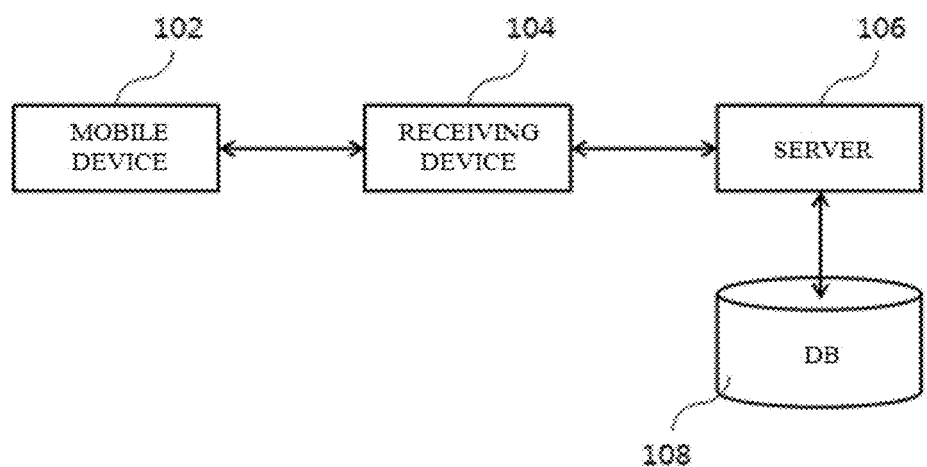
FIG. 1 is a block diagram showing a detailed configuration of a system for measuring a location according to an exemplary embodiment of the present disclosure.

FIG. 1 is a block diagram showing a detailed configuration of a system 100 for measuring a location according to an exemplary embodiment of the present disclosure. As shown in FIG. 1, the system 100 for measuring a location according to an exemplary embodiment of the present disclosure includes a mobile device 102, a receiving device 104, a server 106, and a database (DB) 108.

The mobile device 102 is a terminal owned by a user and may transmit and receive signals to and from the receiving device 104. In exemplary embodiments of the present disclosure, the mobile device 102 may be a portable wireless communication device, for example, a smart phone, a personal digital assistant (PDA), a tablet personal computer (PC), a laptop computer, etc., a wearable device capable of transmitting and receiving signals, and so on. The signals may be radio frequency (RF) signals, for example, a wireless fidelity (WiFi) signal, a Bluetooth signal, and so on.

The receiving device 104 is a device for sensing the mobile device 102. The receiving device 104 may transmit a signal to the mobile device 102 and receive a signal from the mobile device 102. To this end, the receiving device 104 may have at least one directional antenna and receive a signal from the mobile device 102 using the directional antenna. A directional antenna is an antenna that emits a signal in a particular direction or has a receiving sensitivity of a set value or more for a signal received in the opposite direction to the particular direction. In exemplary embodiments of the present disclosure, the receiving device 104 is an RF receiver having a directional antenna and may be, for example, a wireless access point (AP), a beacon, or so on.

At least one receiving device 104 may be installed in a target area. The target area has a wide meaning encompassing outdoor space, for example, a park, a road, etc., as well as indoor space, for example, the inside of a department store, an office, etc. In an exemplary embodiment, the receiving device 104 may be installed in a path along which a user may move in the target area, at a branch point of the path, an exit of the target area, and so on. Here, the directional antenna may receive a signal from a path side extending from a point at which the receiving device 104 is installed with a receiving sensitivity of the set value or more. To this end, an administrator may adjust a signal receiving direction of the directional antenna so that the receiving device 104 may receive the path-side signal. A direction along which a directional antenna may sense a signal with a receiving sensitivity of a set value or more will be referred to as "signal sensing direction" below. The receiving device 104 may receive a signal from each of at least one mobile device 102 in a path on a signal sensing direction side of the directional antenna. When the receiving device 104 includes four directional antennas, the directional antennas may receive signals from different directional path sides. The number of directional antennas included in one receiving device 104 may vary according to an installation location of the receiving device 104, the number of paths branched from the installation location, characteristics of the paths (e.g., widths, lengths, etc. of the paths), and so on.

After receiving a signal from each mobile device 102, the receiving device 104 may transmit information on the signal to the server 106. Here, the information on the signal may include at least one of identification information of the mobile device 102, a received signal strength indication (RSSI) of the received signal, identification information of the receiving device 104, and a time at which the receiving device 104 has received the signal. The identification information of the mobile device 102 is used to identify the mobile device 102 and may be, for example, a media access control (MAC) address of the mobile device 102, a serial number of the mobile device 102, and so on. Also, the identification information of the receiving device 104 is used to identify the receiving device 104 and may be, for example, an identity (ID) of the receiving device 104, coordinate information indicating the installation location of the receiving device 104, an ID of an antenna included in the receiving device 104, and so on.

The server 106 receives the information on the signal from the receiving device 104 and determines a location of the mobile device 102 on the basis of the information on the signal.

To this end, the server 106 may extract a path along which a user may move from a map of the target area and generate a virtual path map composed of nodes corresponding to respective points in the path and links between the nodes. Here, each node may correspond to a branch point of the path.

The server 106 may determine the location of the mobile device 102 using the path map. Specifically, the server 106 may calculate a distance between the mobile device 102 and the receiving device 104 using the path map and the information on the signal and determine the location of the mobile device 102 using the distance.

First, the server 106 may calculate a signal loss coefficient N of Equation 1 below using a test device (not shown) to calculate the distance between the mobile device 102 and the receiving device 104:

$$d = 10^{\frac{TxPower - RSSI}{10*N}} \qquad \text{[Equation 1]}$$

(where d denotes a distance between the test device and the receiving device 104, TxPower denotes a strength of a signal transmitted by the receiving device 104, RSSI denotes a strength of the signal received by the receiving device 104, and N denotes the signal loss coefficient).

Here, the test device is a terminal used to calculate the signal loss coefficient N and may be a portable wireless communication device, a wearable device, etc. capable of transmitting and receiving signals. The test device may be held or handled by the administrator.

First, the server 106 may separately calculate distances between the test device and the receiving device 104 using Equation 1 while a location of the test device in a path corresponding to a link of the path map is changed. To this end, the administrator may move along the path corresponding to the link of the path map while holding the test device, and the location of the test device in the path may be changed accordingly. The server 106 may record actual distances between the test device at corresponding locations and the receiving device 104, an RSSI of a signal received from the test device by the receiving device 104, and times T1, T2, T3, etc. at which the receiving device 104 has received the signal, and calculate distances (e.g., d1, d2, d3, etc.) between the test device and the receiving device 104 at the corresponding times using Equation 1. Here, a TxPower is a value (e.g., −20 dB) which is set in advance as a strength of a signal transmitted to the mobile device 102 by the receiving device 104, and the RSSI may vary according to the location of the test device. Also, the server 106 may use a preset initial value as the signal loss coefficient N.

Subsequently, the server 106 may calculate a signal loss coefficient N which results in a smallest sum of differences between the calculated distances between the test device and the receiving device 104 and the actual distances between the test device and the receiving device 104.

As an example, when actual distances p1, p2, and p3 between the test device and the receiving device 104 are recorded in the server 106 at T1, T2, and T3, the server 106 may acquire d1 by calculating Equation 1 at T1, acquire d2 by calculating Equation 1 at T2, acquire d3 by calculating Equation 3 at T3, and calculate |p1−d1|+|p2−d2|+|p3−d3|=l1+l2+l3. Here, l1, l2, and l3 respectively denote differences between the distances d1, d2, and d3 between the test device and the receiving device 104 calculated using Equation 1 and the actual distances p1, p2, and p3 between the test device and the receiving device 104. Although a sum of the differences between the calculated distances d1, d2, and d3 between the test device and the receiving device 104 and the actual distances p1, p2, and p3 between the test device and the receiving device 104 is expressed as |p1−d1|+|p2−d2|+|p3−d3| for convenience of description, this is an example only, and the sum of the differences may be expressed as various formulae, such as $\sqrt{(p1-d1)^2+(p2-d2)^2+(p3-d3)^2}$ and so on.

While changing the signal loss coefficient N, the server 106 may separately calculate sums (e.g., l1+l2+l3) of the differences between the calculated distances between the test device and the receiving device 104 and the actual distances between the test device and the receiving device 104, and the calculation may be repeated a set number of times. For example, the server 106 may separately calculate l1+l2+l3 at N1, l1+l2+l3 at N2, l1+l2+l3 at N3, and so on. The server 106 may calculate a signal loss coefficient N which results in a smallest sum (e.g., l1+l2+l3) of the differences between the calculated distances between the test device and the receiving device 104 and the actual distances between the test device and the receiving device 104. The signal loss coefficient N calculated through this process may be used to calculate the distance between the mobile device 102 and the receiving device 104.

The server 106 may calculate the distance between the mobile device 102 and the receiving device 104 by applying the calculated signal loss coefficient N to Equation 2 below:

$$d' = 10^{\frac{TxPower-RSSI}{10*N}} \qquad \text{[Equation 2]}$$

(where d' denotes the distance between the mobile device 102 and the receiving device 104, TxPower denotes the strength of a signal transmitted by the receiving device 104, RSSI denotes the strength of the signal received by the receiving device 104, and N denotes the signal loss coefficient).

Here, a TxPower is a value (e.g., −20 dB) which is set in advance as a strength of a signal transmitted to the mobile device 102 by the receiving device 104, and an RSSI may vary according to the location of the mobile device 102. According to exemplary embodiments of the present disclosure, an optimal signal loss coefficient N used for a distance calculation is calculated using a test device, and a distance between the mobile device 102 and the receiving device 104 is calculated using the calculated signal loss coefficient N. Therefore, it is possible to reduce an error between the calculated distance between the mobile device 102 and the receiving device 104 and an actual distance between the mobile device 102 and the receiving device 104 as much as possible.

Also, the server 106 may determine the location of the mobile device 102 using the calculated distance between the mobile device 102 and the receiving device 104. Specifically, the server 106 may match the receiving device 104 to one corresponding node in the path map and determine one point in the link corresponding to the calculated distance between the mobile device 102 whose distance from the node has been calculated and the receiving device 104 as the location of the mobile device 102. In other words, the server 106 may match the mobile device 102 to one point in the link according to the calculated distance between the mobile device 102 and the receiving device 104, and in this case, all mobile devices 102 in the path are matched in the link.

Further, the server 106 may determine a degree of congestion of the path, a movement (or a traffic line) of the mobile device 102 (i.e., a flow of user traffic), and a period of stay of the mobile device 102 using the determined location of the mobile device 102, etc. The degree of congestion of the path may be a numerical value representing the number of people in the path (i.e, the number of the mobile device 102 in the path).

As an example, the server 106 may calculate the number of mobile devices 102 in the link and determine a degree of congestion of the path from the number of mobile devices 102.

As another example, the server 106 may acquire the movement and the period of stay of the mobile device 102 from the location of the mobile device 102 and the time at which the receiving device 104 has received the signal.

Moreover, the server 106 may display at least one of the degree of congestion of the path, the movement of the mobile device 102, and the period of stay of the mobile device 102. By monitoring information displayed in the server 106, the administrator may detect the degree of congestion of the path in which the mobile device 102 is present and the location, the movement, the period of stay, etc. of the mobile device 102 more easily.

The DB 108 is a storage in which a signal loss coefficient N calculated by the server 106, information on the location of the mobile device 102 determined by the server 106, etc. are stored. The server 106 may calculate the signal loss coefficient N which results in a smallest sum of differences between calculated distances between the test device and the receiving device 104 and actual distances between the test device and the receiving device 104, and store the calculated signal loss coefficient N in the DB 108. Also, the server 106 may determine the location of the mobile device 102 using the calculated distance between the mobile device 102 and the receiving device 104 and store location information of the mobile device 102 (e.g., location coordinates of the mobile device 102 in the link) in the DB 108. Although FIG. 1 shows that the DB 108 is separated from the server 106 for convenience of description, this is an exemplary embodiment only, and the DB 108 may be a component of the server 106.

Figure 2:
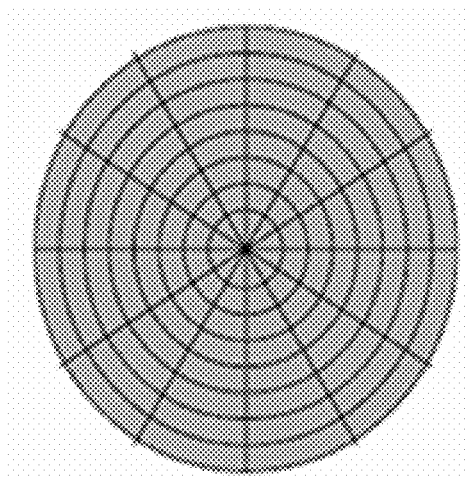
FIG. 2 is a diagram showing an omnidirectional characteristic of a general omnidirectional antenna.
Figure 3:
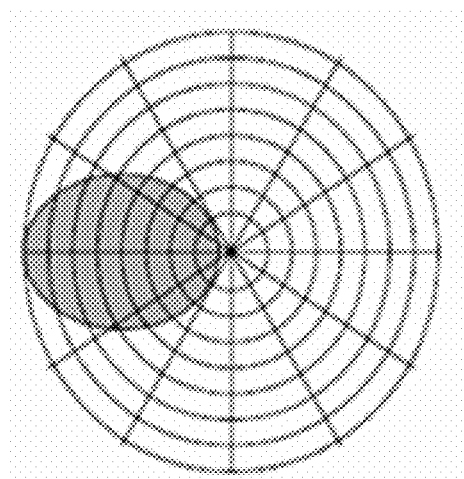
FIG. 3 is a diagram showing a directional characteristic of a directional antenna according to an exemplary embodiment of the present disclosure.

FIG. 2 is a diagram showing an omnidirectional characteristic of a general omnidirectional antenna, and FIG. 3 is a diagram showing a directional characteristic of a directional antenna according to an exemplary embodiment of the present disclosure.

Referring to FIG. 2, a general omnidirectional antenna senses a signal from all directions as in 360 degrees. When an omnidirectional antenna is used to measure a location of the mobile device 102, a signal sensing range increases. Accordingly, a sensing distance is shortened, and a probability that noise will be generated in surroundings increases. In this case, a signal may be sensed in a duplicated manner, and a probability that there is an error between a measured location of the mobile device 102 and an actual location of the mobile device 102 increases due to propagation characteristics (reflection, scattering, diffraction, refraction, etc.). Also, since each omnidirectional antenna senses a signal, measured locations of the mobile device 102 may be diffused, and it may be difficult to detect a movement and a period of stay of the mobile device 102.

To solve these problems, the receiving device 104 according to an exemplary embodiment of the present disclosure may include one or more directional antennas and measure the location of the mobile device 102 using the directional antennas. Here, the respective directional antennas may receive signals from different path sides.

As shown in FIG. 3, a directional antenna emits a signal in a particular direction or has a receiving sensitivity of a set value or more for a signal received in the opposite direction to the particular direction. Therefore, when a directional antenna is used to measure a location of the mobile device 102, it is possible to reduce influence of characteristics of a radio wave and surroundings as much as possible, and prevent in advance a signal from being sensed in a duplicated manner. In this case, it is possible to detect a movement and a period of stay of the mobile device 102 more easily.

Figure 4:
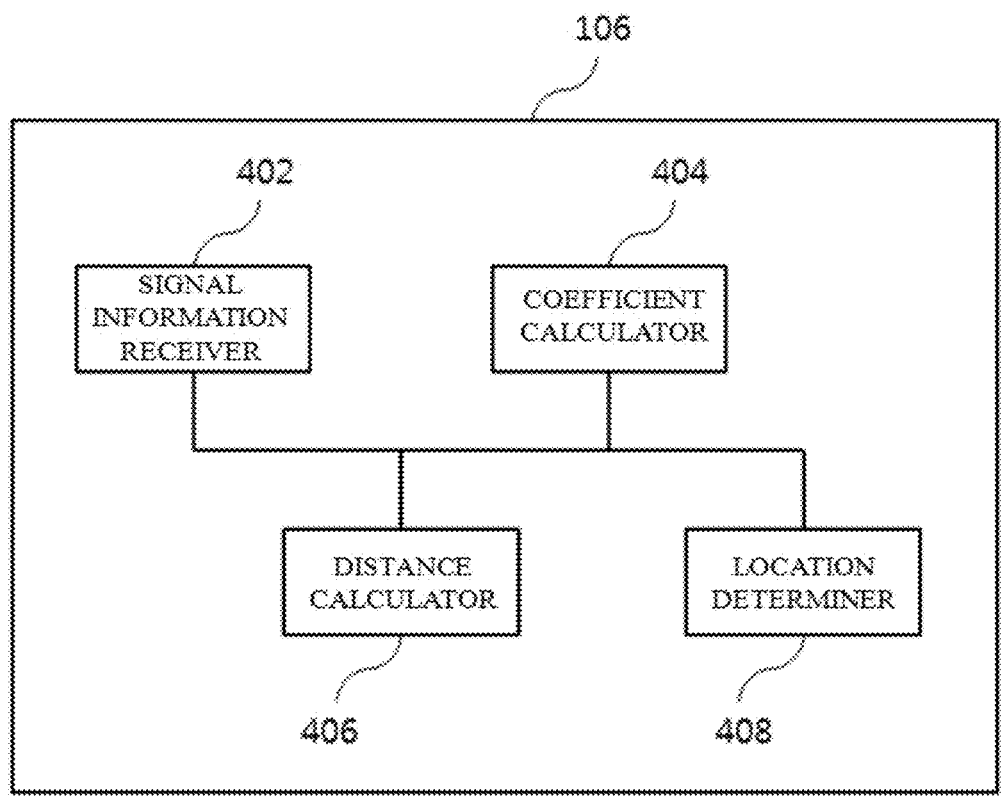
FIG. 4 is a block diagram showing a detailed configuration of a server according to an exemplary embodiment of the present disclosure.

FIG. 4 is a block diagram showing a detailed configuration of the server 106 according to an exemplary embodiment of the present disclosure. As shown in FIG. 4, the server 106 according to an exemplary embodiment of the present disclosure includes a signal information receiver 402, a coefficient calculator 404, a distance calculator 406, and a location determiner 408.

The signal information receiver 402 receives information on a signal, which is received by the receiving device 104 from the mobile device 102, from the receiving device 104. The information on the signal may include at least one of identification information of the mobile device 102, an RSSI of the received signal, identification information of the receiving device 104, and a time at which the receiving device 104 has received the signal.

The coefficient calculator 404 calculates a signal loss coefficient N for calculating the distance between the mobile device 102 and the receiving device 104. Specifically, while the location of the test device present in a path corresponding to a link of the path map is changed, the coefficient calculator 404 may separately calculate distances between the test device and the receiving device 104 using the above-described Equation 1 and calculate a signal loss coefficient N which results in a smallest sum of differences between the calculated distances between the test device and the receiving device 104 and actual distances between the test device and the receiving device 104. Subsequently, the coefficient calculator 404 may store the calculated signal loss coefficient N in the DB 108.

The distance calculator 406 calculates the distance between the mobile device 102 and the receiving device 104 using the calculated signal loss coefficient N. Specifically, the distance calculator 406 may calculate the distance between the mobile device 102 and the receiving device 104 by applying the calculated signal loss coefficient N to the above-described Equation 2.

The location determiner 408 may determine the location of the mobile device 102 using the calculated distance between the mobile device 102 and the receiving device 104. Specifically, the server 106 may match the receiving device 104 to one corresponding node in the path map and determine one point in the link corresponding to the calculated distance between the mobile device 102 whose distance from the node has been calculated and the receiving device 104 as the location of the mobile device 102. Subsequently, the location determiner 408 may store information on the determined location of the mobile device 102 in the DB 108.

Figure 5:
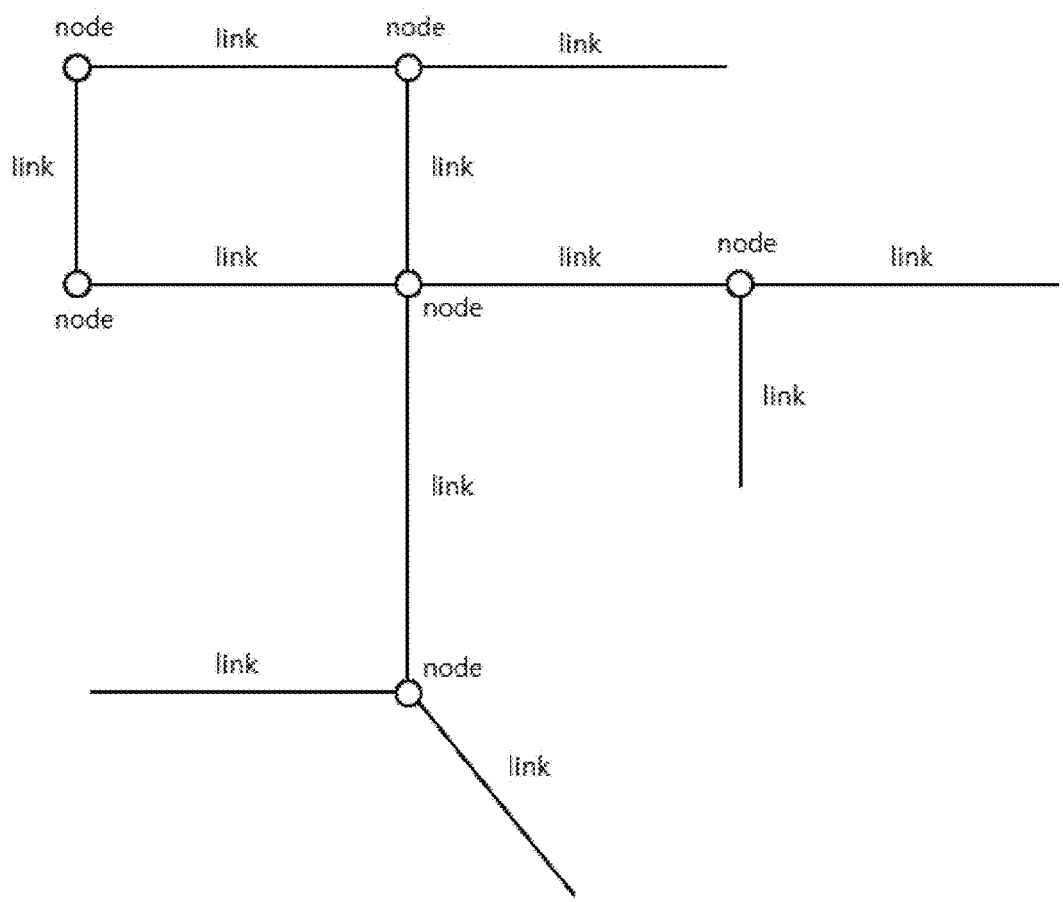
FIG. 5 is an example diagram of a path map according to an exemplary embodiment of the present disclosure.

FIG. 5 is an example diagram of a path map according to an exemplary embodiment of the present disclosure. As described above, the server 106 may extract a path along which a user may move from a map of a target area and generate a virtual path map from the path.

As shown in FIG. 5, the server 106 may generate a virtual path map composed of nodes which correspond to points in the path on a one-to-one basis and links between the nodes. Here, each node may correspond to, for example, a branch point of the path.

Figure 6:
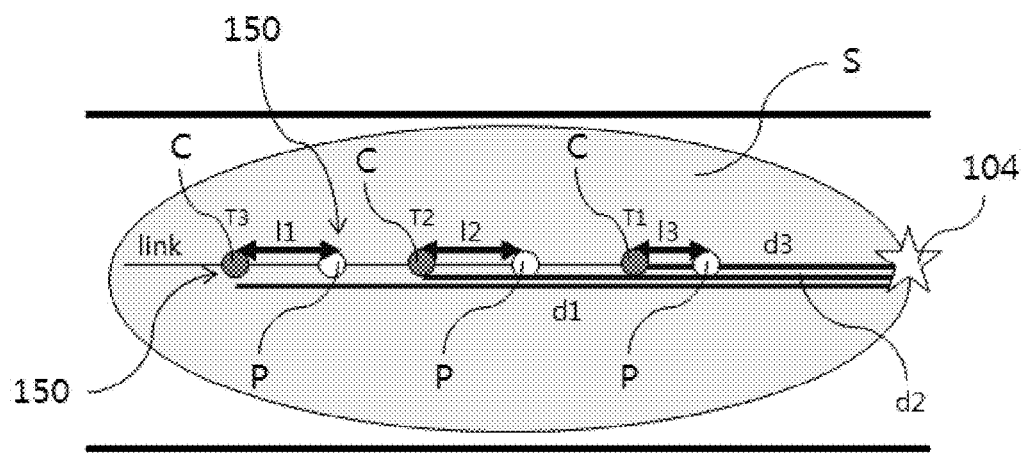
FIG. 6 is a diagram illustrating a process in which a server calculates a signal loss coefficient to calculate a distance between a mobile device and a receiving device according to an exemplary embodiment of the present disclosure.

FIG. 6 is a diagram illustrating a process in which the server 106 calculates a signal loss coefficient N to calculate a distance between the mobile device 102 and the receiving device 104 according to an exemplary embodiment of the present disclosure.

As shown in FIG. 6, while a location of a test device 150 in a path corresponding to a link of a path map is changed, the server 106 may separately calculate distances between the test device 150 and the receiving device 104 using Equation 1. Here, an area S denotes a signal sensing range of a directional antenna.

To this end, the administrator may move along a path corresponding to a link of the path map while holding the test device 150, and the location of the test device 150 in the path may be changed accordingly. The server 106 may record actual distances between the test device 150 at corresponding locations and the receiving device 104, an RSSI of a signal received from the test device 150 by the receiving device 104, and times T1, T2, T3, etc. at which the receiving device 104 has received the signal, and calculate distances (e.g., d1, d2, d3, etc.) between the test device 150 and the receiving device 104 at corresponding times using Equation 1. Here, a TxPower is a value which is set in advance as a strength of a signal transmitted to the test device 150 by the receiving device 104, and the RSSI may vary according to the location of the test device 150. Also, the server 106 may use a preset initial value as the signal loss coefficient N.

Subsequently, the server 106 may calculate a signal loss coefficient N which results in a smallest sum of differences between distances between the test device 150 and the receiving device 104 and actual distances between the test device 150 and the receiving device 104.

As an example, when actual distances p1, p2, and p3 between the test device 150 and the receiving device 104 are recorded in the server 106 at T1, T2, and T3, the server 106 may acquire d1 by calculating Equation 1 at T1, acquire d2 by calculating Equation 1 at T2, acquire d3 by calculating Equation 3 at T3, and calculate |p1−d1|+|p2−d2|+|p3−d3|=l1+l2+l3. Here, l1, l2, and l3 respectively denote differences between the distances d1, d2, and d3 between the test device 150 and the receiving device 104 calculated using Equation 1 and the actual distances p1, p2, and p3 between the test device 150 and the receiving device 104. P shown in FIG. 6 denotes an actual location of the test device 150, and C denotes a measured location of the test device 150 calculated with an RSSI.

While changing the signal loss coefficient N, the server 106 may separately calculate sums (e.g., l1+l2+l3) of the differences between the calculated distances between the test device 150 and the receiving device 104 and the actual distances between the test device 150 and the receiving device 104, and the calculation may be repeated a set number of times. For example, the server 106 may separately calculate 11+12+13 at N1, 11+12+13 at N2, 11+12+13 at N3, and so on. The server 106 may calculate a signal loss coefficient N which results in a smallest sum (e.g., 11+12+13) of the differences between the calculated distances between the test device and the receiving device 104 and the actual distances between the test device and the receiving device 104. The signal loss coefficient N calculated through this process may be used to calculate a distance between the mobile device 102 and the receiving device 104.

Figure 7:
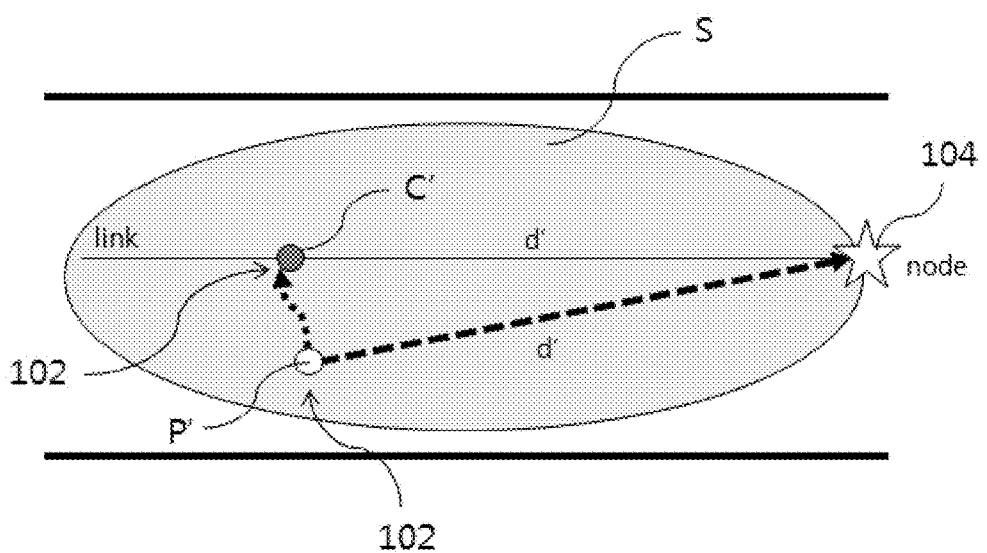
FIG. 7 is a diagram illustrating a process in which a server determines a location of a mobile device according to an exemplary embodiment of the present disclosure.

FIG. 7 is a diagram illustrating a process in which the server 106 determines a location of the mobile device 102 according to an exemplary embodiment of the present disclosure. As described above, the server 106 may calculate a distance d' between the mobile device 102 and the receiving device 104 by applying the calculated signal loss coefficient N to the above-described Equation 2.

Referring to FIG. 7, the server 106 may determine the location of the mobile device 102 using the calculated distance d' between the mobile device 102 and the receiving device 104. Specifically, the server 106 may match the receiving device 104 to one corresponding node in a path map and determine one point C' in a link corresponding to the calculated distance d' between the mobile device 102 whose distance from the node has been calculated and the receiving device 104 as the location of the mobile device 102. P' shown in FIG. 7 denotes an actual location of the mobile device 102, and C' denotes the location of the mobile device 102 matched in the link of the path map.

Figure 8:
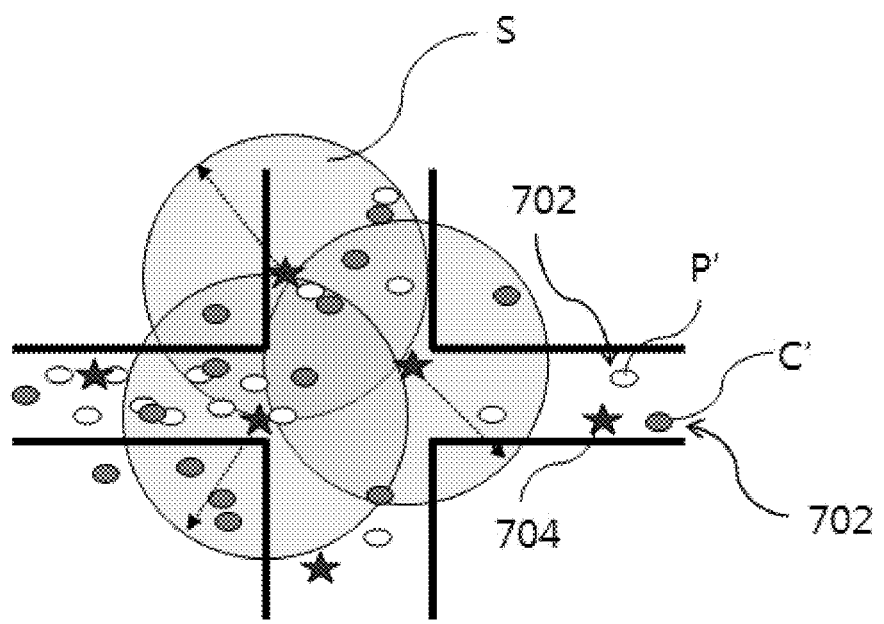
FIG. 8 is a diagram illustrating a general method of measuring a location.
Figure 9:
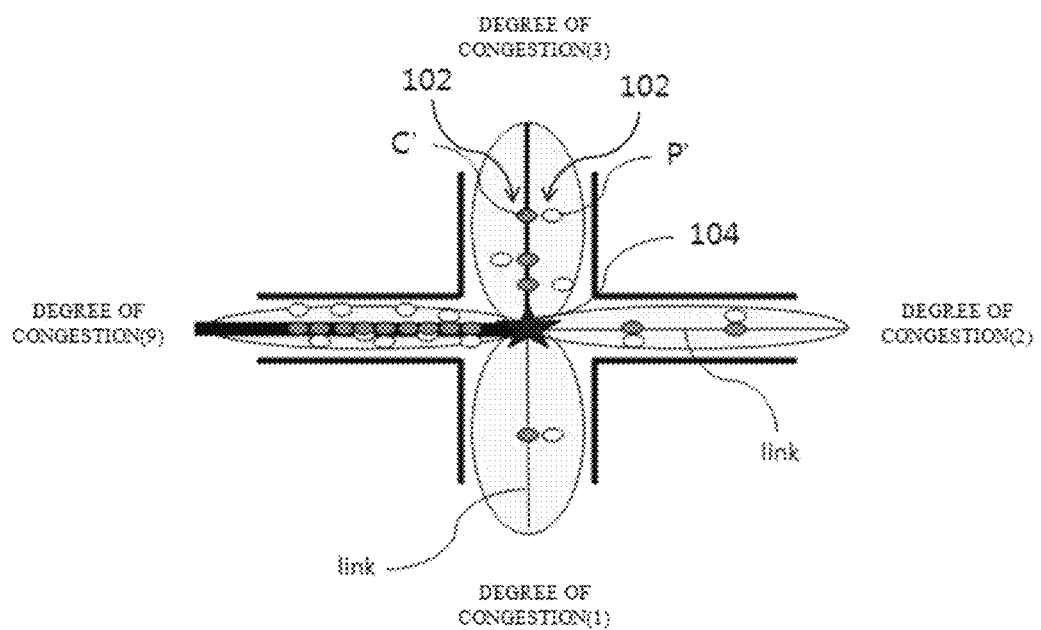
FIG. 9 is a diagram illustrating a method of measuring a location according to an exemplary embodiment of the present disclosure.

FIG. 8 is a diagram illustrating a general method of measuring a location, and FIG. 9 is a diagram illustrating a method of measuring a location according to an exemplary embodiment of the present disclosure.

Referring to FIG. 8, trilateration, triangulation, and fingerprint positioning are generally used as indoor positioning methods. However, these indoor positioning methods require multiple RF receivers 704 and involve a cumbersome positioning process. Specifically, trilateration and triangulation require at least three RF receivers 704, and fingerprint positioning requires multiple RF receivers 704 and involves onerously collecting fingerprints at respective locations in advance. Further, according to the existing positioning methods, since RF receivers sense a signal using an omnidirectional antenna, measuring of the location of a mobile device is much affected by characteristics of a radio wave and surroundings, and there is a risk that a signal will be sensed in a duplicated manner. The method of measuring a location according to an exemplary embodiment of the present disclosure may solve these problems of the existing positioning methods. P' shown in FIG. 8 denotes an actual location of the mobile device 702, and C' denotes a location of the mobile device 702 measured by trilateration, triangulation, fingerprint positioning, or so on.

As shown in FIG. 9, according to exemplary embodiments of the present disclosure, one receiving device 104 including a directional antenna may be used to measure a location of a mobile device 102 according to each path (or link). P' shown in FIG. 9 denotes an actual location of the mobile device 102, and C' denotes a location of the mobile device 102 matched in a link of a path map. As described above, the server 106 may match the mobile device 102 to one point in a link according to a distance between the mobile device 102 and the receiving device 104 calculated using Equations 1 and 2, and in this case, all mobile devices 102 in the path are matched in the link.

Also, the server 106 may determine at least one of a degree of congestion of the path, a movement of the mobile device 102, and a period of stay of the mobile device 102 using the determined location of the mobile device 102 (i.e., a location of the mobile device 102 matched in the link).

As an example, the server 106 may calculate the number of mobile devices 102 in the link and determine a degree of congestion of the path from the number of mobile devices 102. For example, when there are three mobile devices 102 in a first link corresponding to a first path, a degree of congestion of the first path may be 3, and when there are nine mobile devices 102 in a second link corresponding to a second path, a degree of congestion of the second path may be 9.

As another example, the server 106 may acquire the movement and the period of stay of the mobile device 102 from the location of the mobile device 102 and a time at which the receiving device 104 has received a signal. For example, assuming that the mobile device 102 is in the first link corresponding to the first path between T1 and T2 and is in the second link corresponding to the second path between T2 and T3, the server 106 may determine that the mobile device 102 has moved from the first path to the second path and separately calculate periods of stay of the mobile device 102 in the first path and the second path (i.e., T2−T1 and T3−T2).

Further, the server 106 may display at least one of the degree of congestion of the path, the movement of the mobile device 102, and the period of stay of the mobile device 102. By monitoring information displayed in the server 106, the administrator may detect the degree of congestion of the path in which the mobile device 102 is present and the location, the movement, the period of stay, etc. of the mobile device 102 more easily.

Figure 10:
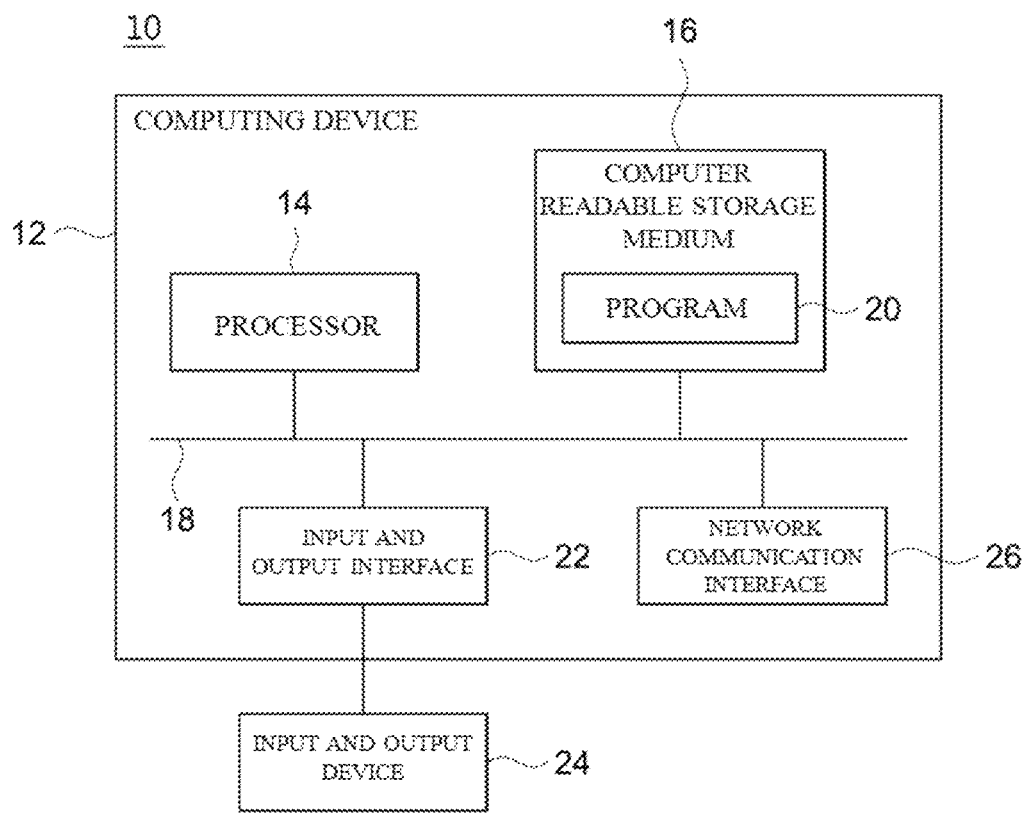
FIG. 10 is a block diagram illustrating, by way of example, a computing environment including a computing device which is appropriate to be used in exemplary embodiments.

FIG. 10 is a block diagram illustrating, by way of example, a computing environment including a computing device which is appropriate to be used in exemplary embodiments. In an exemplary embodiment shown in the drawing, each component may have functions and capabilities other than those described below, and there may be additional components other than those described below.

A computing environment 10 shown in the drawing includes a computing device 12. In an exemplary embodiment, the computing device 12 may be the system 100 for measuring a location or at least one component included in the system 100 for measuring a location.

The computing device 12 includes at least one processor 14, a computer-readable storage medium 16, and a communication bus 18. The processor 14 may cause the computing device 12 to operate according to the aforementioned exemplary embodiments. For example, the processor 14 may execute one or more programs stored in the computer-readable storage medium 16. The one or more programs may include one or more computer-executable instructions, and the computer-executable instructions may be configured to cause the computing device 12 to perform operations according to the exemplary embodiments when executed by the processor 14.

The computer-readable storage medium 16 is configured to store computer-executable instructions or program code, program data, and/or information of other suitable forms. A program 20 stored in the computer-readable storage medium 16 includes a set of instructions executable by the processor 14. In an exemplary embodiment, the computer-readable storage medium 16 may be a memory (a volatile memory, such as a random access memory (RAM), a non-volatile memory, or an appropriate combination thereof), one or more magnetic disk storage devices, optical disk storage devices, flash memory devices, other storage devices of other forms that may be accessed by the computing device 12 and store desired information, or an appropriate combination thereof.

The communication bus 18 connects various components of the computing device 12 including the processor 14 and the computer-readable storage medium 16 to each other.

The computing device 12 may also include at least one input/output (I/O) interface 22 that provides an interface for at least one I/O device 24 and at least one network communication interface 26. The I/O interface 22 and the network communication interface 26 are connected to the communication bus 18. The I/O device 24 may be connected to other components of the computing device 12 through the I/O interface 22. The exemplary I/O device 24 may include an input device, such as a pointing device (a mouse, a trackpad, or so on), a keyboard, a touch input device (a touchpad, a touch screen, or so on), a voice or sound input device, various kinds of sensor devices, and/or a photography device, and/or an output device, such as a display device, a printer, a speaker, and/or a network card. The exemplary I/O device 24 may be included in the computing device 12 as one component of the computing device 12 or may be connected to the computing device 12 as a separate device distinguished from the computing device 12.

Figure 11:
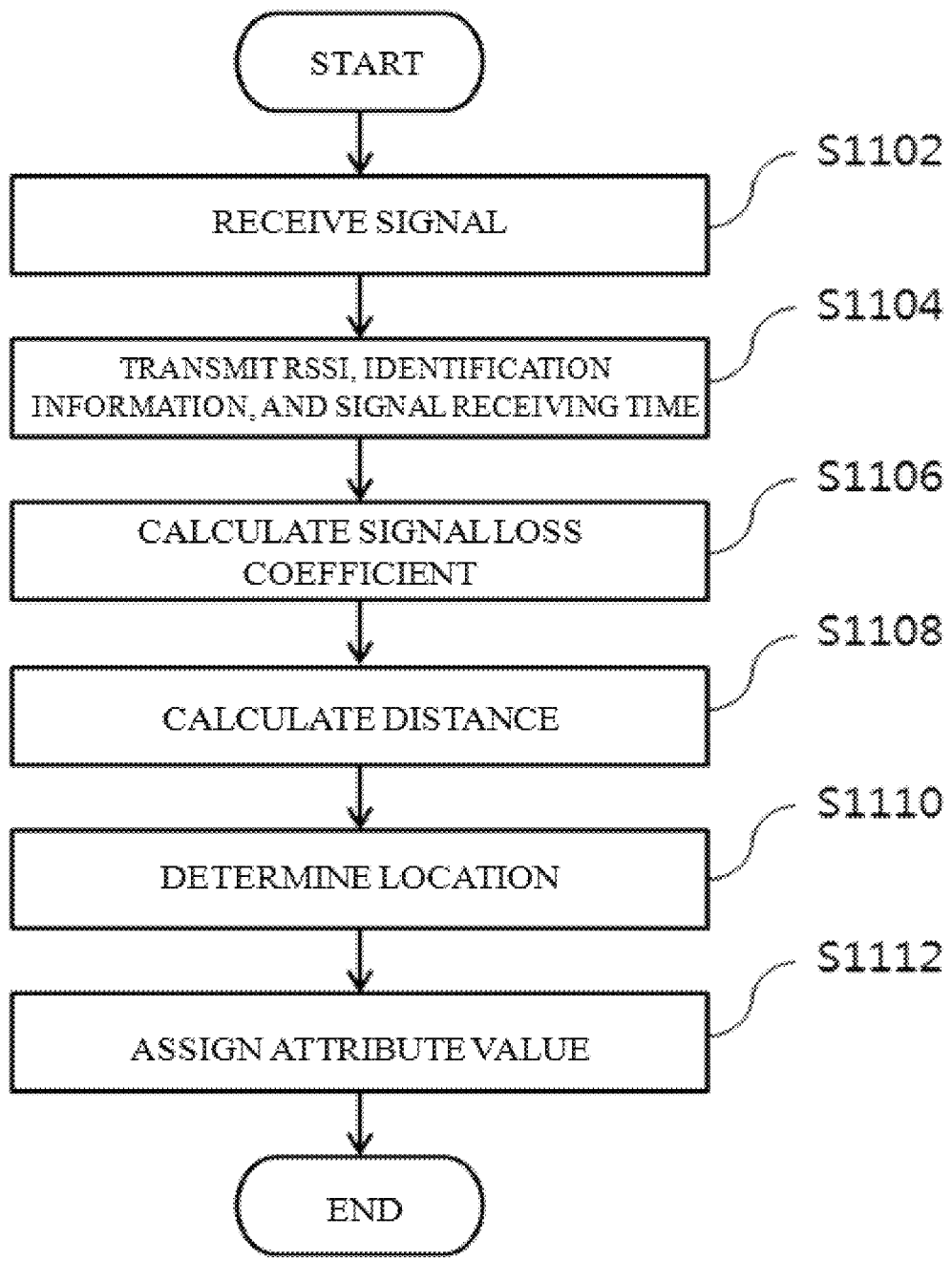
FIG. 11 is a diagram illustrating a method of measuring a location according to an exemplary embodiment of the present disclosure.

FIG. 11 is a diagram illustrating a method of measuring a location according to an exemplary embodiment of the present disclosure. In the flowchart shown in the drawing, the method is divided into a plurality of operations and illustrated. However, at least some operations may be performed in a different order, performed in combination with another operation, omitted, performed in sub-operations, or performed together with at least one additional operation that is not shown.

First, the receiving device 104 receives a signal from the mobile device 102 (S1102). As described above, the receiving device 104 may include at least one directional antenna and receive a signal from each of at least one mobile device 102 in a path on a signal sensing direction side of the directional antenna.

Subsequently, the receiving device 104 transmits information on the signal to the server 106 (S1104). The information on the signal may include at least one of identification information of the mobile device 102, an RSSI of the received signal, identification information of the receiving device 104, and a time at which the receiving device 104 has received the signal.

Subsequently, the server 106 calculates a signal loss coefficient N for calculating a distance between the mobile device 102 and the receiving device 104 (S1106). While a location of a test device in a path corresponding to a link of a path map is changed, the server 106 may separately calculate distances between the test device and the receiving device 104 using the above-described Equation 1 and calculate a signal loss coefficient N which results in a smallest sum of differences between the calculated distances between the test device and the receiving device 104 and actual distances between the test device and the receiving device 104.

Subsequently, the server 106 calculates the distance between the mobile device 102 and the receiving device 104 using the calculated signal loss coefficient N (S1108). Specifically, the server 106 may calculate the distance between the mobile device 102 and the receiving device 104 by applying the calculated signal loss coefficient N to the above-described Equation 2.

Subsequently, the server 106 determines the location of the mobile device 102 using the calculated distance between the mobile device 102 and the receiving device 104 (S1110). Specifically, the server 106 may match the receiving device 104 to one corresponding node in the path map and match the mobile device 102 to one point in the link according to the calculated distance between the mobile device 102 and the receiving device 104.

Finally, the server 106 assigns an attribute value to the link using the determined location of the mobile device 102 (S1112). Here, the attribute value may be information representing an attribute of the path, for example, a degree of congestion of the path. The server 106 may calculate the number of mobile devices 102 in the link and determine the degree of congestion of the path from the number of the mobile devices 102. Also, the server 106 may acquire a movement and a period of stay of the mobile device 102 from the location of the mobile device 102 and the time at which the receiving device 104 has received the signal.

According to exemplary embodiments of the present disclosure, a location of a mobile device may be measured according to paths (or links) using one receiving device including a directional antenna, and it is possible to easily detect path-specific numbers of mobile devices and degrees of congestion from the path-specific locations of mobile devices. Also, according to exemplary embodiments of the present disclosure, it is possible to easily detect a movement and a period of stay of the mobile device from the location of the mobile device and a time at which a receiving device has received a signal. In particular, according to exemplary embodiments of the present disclosure, an optimal signal loss coefficient N used for distance calculation may be calculated using a test device, and a distance between the mobile device and the receiving device may be calculated using the calculated signal loss coefficient N. Therefore, it is possible to reduce an error between the calculated distance between the mobile device and the receiving device and an actual distance between the mobile device and the receiving device as much as possible.

Such a positioning technique may be widely used in the security and safety fields which require information on the number of people in a particular path or section, and path-specific degrees of congestion, a movement and a period of stay of a mobile device, etc. acquired using the positioning technique may be used as marketing information. Also, according to the positioning technique, since only one receiving device is used to measure a location of a mobile device, the cost of installation and management of the receiving device may be reduced.

Although exemplary embodiments of the present disclosure have been described in detail above, those of ordinary skill in the art would appreciate that various modifications and variations are possible from the above description without departing from the scope of the present disclosure. Therefore, the scope of the present disclosure should be determined by the following claims and their equivalents, and should not be limited or determined by the foregoing detailed description.

What is claimed is:

1. A system for measuring a location, the system comprising:
　　a receiving device comprising a directional antenna, the receiving device being configured to receive a signal from a mobile device in a path at a signal sensing direction side of the directional antenna; and
　　a server configured to receive from the receiving device, information on the signal, calculate a distance between the mobile device and the receiving device based on the information on the signal, determine a location of the mobile device based on the distance, and determine a degree of congestion of the path using the location,
wherein the server is further configured to generate a path map comprising nodes and links between the nodes, match the receiving device to a node, and determines one point in a link whose distance from the node corresponds to the distance between the mobile device and the receiving device, as the location of the mobile device.

2. The system of claim 1, wherein the information on the signal comprises at least one from among identification information of the mobile device, a received signal strength indication (RSSI) of the signal, identification information of the receiving device, and a time at which the receiving device has received the signal.

3. The system of claim 2, wherein the server is further configured to separately calculate distances between a test device and the receiving device using Equation 1 while a location of the test device in the path is changed, and calculate a signal loss coefficient N which results in a smallest sum of differences between the calculated distances between the test device and the receiving device and actual distances between the test device and the receiving device:

$$d = 10^{\frac{TxPower-RSSI}{10*N}}, \qquad \text{[Equation 1]}$$

wherein d is the distance between the test device and the receiving device, TxPower is a strength of a signal transmitted by the receiving device, and the RSSI is a strength of the signal received by the receiving device.

4. The system of claim 3, wherein the server is further configured to calculate another distance between the mobile device and the receiving device by applying the calculated signal loss coefficient N to Equation 2:

$$d' = 10^{\frac{TxPower-RSSI}{10*N}}, \qquad \text{[Equation 2]}$$

wherein d' is the other distance between the mobile device and the receiving device, TxPower is the strength of the signal transmitted by the receiving device, and the RSSI is the strength of the signal received by the receiving device.

5. The system of claim 2, wherein the server is further configured to calculate a number of mobile devices in the link and determined the degree of congestion of the path from the number of mobile devices.

6. The system of claim 5, wherein the server is further configured to acquire a movement and a period of stay of the mobile device from the location of the mobile device and a time at which the receiving device has received the signal.

7. The system of claim 6, wherein the server displays at least one from among the degree of congestion of the path, the movement of the mobile device, and the period of stay of the mobile device.

8. A method of measuring a location, the method comprising:
receiving, by a receiving device having a directional antenna, a signal from a mobile device in a path at a signal sensing direction side of the directional antenna;
receiving, by a server, information on the signal from the receiving device;
calculating, by the server, a distance between the mobile device and the receiving device based on the information on the signal;
determining, by the server, a location of the mobile device based on the distance; and
determining, by the server, a degree of congestion of the path based on the location,
wherein the determining of the location of the mobile device using the distance comprises:
generating a path map comprising nodes and links between the nodes;
matching the receiving device to a node; and
determining one point in a link whose distance from the node corresponds to the distance between the mobile device and the receiving device as the location of the mobile device.

9. The method of claim 8, wherein the information on the signal comprises at least one from among identification information of the mobile device, a received signal strength indication (RSSI) of the signal, identification information of the receiving device, and a time at which the receiving device has received the signal.

10. The method of claim 9, wherein the calculating of the distance between the mobile device and the receiving device comprises:
separately calculating distances between a test device and the receiving device using Equation 1 while a location of the test device in the path is changed; and
calculating a signal loss coefficient N which results in a smallest sum of differences between the calculated distances between the test device and the receiving device and actual distances between the test device and the receiving device:

$$d = 10^{\frac{TxPower-RSSI}{10*N}}, \qquad \text{[Equation 1]}$$

wherein d is the distance between the test device and the receiving device, TxPower is a strength of a signal transmitted by the receiving device, and the RSSI is a strength of the signal received by the receiving device.

11. The method of claim 10, wherein the calculating of the distance between the mobile device and the receiving device further comprises calculating another distance between the mobile device and the receiving device by applying the calculated signal loss coefficient N to Equation 2:

$$d' = 10^{\frac{TxPower-RSSI}{10*N}}, \qquad \text{[Equation 2]}$$

wherein d' is the other distance between the mobile device and the receiving device, TxPower is the strength of the signal transmitted by the receiving device, and the RSSI is the strength of the signal received by the receiving device.

12. The method of claim 9, wherein the determining of the degree of congestion comprises calculating a number of mobile devices in the link and acquiring the degree of congestion of the path from the number of mobile devices.

13. The method of claim 12, wherein the method further comprises determining, by the server, a movement and a period of stay of the mobile device from the location of the mobile device and the time at which the receiving device has received the signal.

14. The method of claim 13, wherein the method further comprises displaying, by the server, at least one from among the degree of congestion of the path, the movement of the mobile device, and the period of stay of the mobile device.

* * * * *